(12) United States Patent
Hu et al.

(10) Patent No.: US 9,131,026 B2
(45) Date of Patent: Sep. 8, 2015

(54) METHOD AND SYSTEM FOR ESTABLISHING MEDIA CHANNEL BASED ON RELAY

(75) Inventors: Yongsheng Hu, Shenzhen (CN); Wei Wang, Shenzhen (CN); Zhifeng Chen, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 13/814,909

(22) PCT Filed: Jul. 25, 2011

(86) PCT No.: PCT/CN2011/077592
§ 371 (c)(1),
(2), (4) Date: Feb. 7, 2013

(87) PCT Pub. No.: WO2012/019508
PCT Pub. Date: Feb. 16, 2012

(65) Prior Publication Data
US 2013/0138822 A1 May 30, 2013

(30) Foreign Application Priority Data
Aug. 9, 2010 (CN) .......................... 2010 1 0254720

(51) Int. Cl.
*G06F 15/16* (2006.01)
*H04L 29/06* (2006.01)
(Continued)

(52) U.S. Cl.
CPC ............ *H04L 65/60* (2013.01); *H04L 61/2589* (2013.01); *H04L 65/103* (2013.01);
(Continued)

(58) Field of Classification Search
CPC ..... H04L 63/08; H04L 63/20; H04L 63/1069; H04L 65/2589
See application file for complete search history.

(56) References Cited

U.S. PATENT DOCUMENTS 6,889,328 B1 * 5/2005 Sanchez Herrero et al. ...... 726/3
6,975,876 B1 * 12/2005 Cast et al. ..................... 455/466
(Continued)

FOREIGN PATENT DOCUMENTS

| CN | 101110774 A | 1/2008 |
|---|---|---|
| CN | 101483764 A | 7/2009 |
| CN | 101977178 A | 2/2011 |

OTHER PUBLICATIONS

European Supplementary Search Report for corresponding European patent application 11816067.0 based on PCT/CN2011/077592 dated Dec. 16, 2013.
(Continued)

*Primary Examiner* — Joshua Joo
(74) *Attorney, Agent, or Firm* — Koppel, Patrick, Heybl & Philpott (57) ABSTRACT

The disclosure discloses a method and a system for establishing a media channel based on relay. The method comprises: during a session negotiation process between a first User Equipment (UE) and a second UE, a media relay control server allocating a first service identifier and a second service identifier, transmitting the first service identifier to the first UE, transmitting the second service identifier to the second UE, and transmitting the first service identifier and the second service identifier to a media relay device; the media relay device receiving the service identifiers reported by the first UE and the second UE; the media relay device verifying, according to the first service identifier and the second identifier transmitted by the media relay control server, the service identifiers reported by the first UE and the second UE, and establishing a media channel between the first UE and the second UE if the verification is passed. Through this disclosure, the security of connections between network nodes is improved.

9 Claims, 7 Drawing Sheets

(51) Int. Cl.
*H04L 29/08* (2006.01)
*H04L 29/12* (2006.01)

(52) U.S. Cl.
CPC .......... *H04L65/1069* (2013.01); *H04L 65/605* (2013.01); *H04L 67/141* (2013.01); *H04L 67/146* (2013.01); *H04L 69/24* (2013.01); *H04L 63/083* (2013.01)

(56) References Cited

U.S. PATENT DOCUMENTS

| | | | |
|---|---|---|---|
| 7,257,837 | B2 | 8/2007 | Xu |
| 7,290,141 | B2 * | 10/2007 | Sengodan et al. ............. 713/168 |
| 7,673,135 | B2 * | 3/2010 | Chin et al. ..................... 713/159 |
| 7,801,059 | B2 * | 9/2010 | Miyajima et al. ............. 370/254 |
| 7,831,715 | B2 * | 11/2010 | Yoshimi et al. ............... 709/227 |
| 8,312,169 | B2 * | 11/2012 | Perumal et al. ............... 709/245 |
| 8,537,854 | B2 * | 9/2013 | Bae et al. ...................... 370/466 |
| 8,838,800 | B2 * | 9/2014 | Carruthers .................... 709/226 |
| 2002/0143922 | A1 * | 10/2002 | Tanimoto ...................... 709/223 |
| 2004/0098507 | A1 * | 5/2004 | Thubert et al. ................ 709/245 |
| 2004/0246332 | A1 * | 12/2004 | Crouch ...................... 348/14.08 |
| 2005/0080873 | A1 * | 4/2005 | Joseph .......................... 709/217 |
| 2005/0165719 | A1 * | 7/2005 | Greenspan et al. ................. 707/1 |
| 2005/0182639 | A1 * | 8/2005 | Dale ................................. 705/1 |
| 2007/0011731 | A1 * | 1/2007 | Le et al. .......................... 726/11 |
| 2007/0037553 | A1 * | 2/2007 | Patel et al. .................... 455/410 |
| 2009/0094684 | A1 * | 4/2009 | Chinnusamy et al. ............ 726/4 |
| 2009/0165095 | A1 * | 6/2009 | Ishikawa et al. .................. 726/4 |
| 2009/0319674 | A1 * | 12/2009 | Yahyaoui et al. ............. 709/228 |
| 2010/0002701 | A1 | 1/2010 | Hsieh et al. |
| 2010/0054217 | A1 * | 3/2010 | Oulai ............................ 370/338 |
| 2010/0154047 | A1 * | 6/2010 | Roach et al. ....................... 726/9 |
| 2010/0246484 | A1 * | 9/2010 | Hirano et al. ................. 370/328 |
| 2010/0260071 | A1 * | 10/2010 | Lai et al. ....................... 370/256 |
| 2010/0293297 | A1 * | 11/2010 | Perumal et al. ............... 709/245 |
| 2010/0296481 | A1 * | 11/2010 | Weniger et al. ............... 370/331 |
| 2011/0099097 | A1 * | 4/2011 | Svedberg ......................... 705/30 |
| 2011/0138458 | A1 * | 6/2011 | Kumar et al. .................... 726/15 |
| 2011/0176476 | A1 * | 7/2011 | Tsuruoka ....................... 370/315 |
| 2011/0238822 | A1 * | 9/2011 | Weniger et al. ............... 709/224 |
| 2012/0113937 | A1 * | 5/2012 | Aramoto et al. ............... 370/329 |
| 2012/0207151 | A1 * | 8/2012 | Alt et al. ....................... 370/354 |
| 2013/0170471 | A1 * | 7/2013 | Nix ............................... 370/331 |

OTHER PUBLICATIONS

Wan G. Nan, Sun Bao-suo, Wang Yue-ping, "Research and Design of NAT Traversal Scheme in P2PSIP System", Computer Technology and Development, Jiangsu Province Key Lab. of Computer IT, School of Computer of Soochow University, Suzhou 2152006, China, vol. 19, No. 10, Oct. 2009.
International Search Report (Form PCT/ISA/210) for PCT/CN2011/077592, mailed Nov. 3, 2011.
International Preliminary Report on Patentability (PCT/IB/373) issued Feb. 12, 2013 and Written Opinion of the International Searching Authority (PCT/ISA/237) & English translation.

* cited by examiner

METHOD AND SYSTEM FOR ESTABLISHING MEDIA CHANNEL BASED ON RELAY

FIELD OF THE INVENTION

The disclosure relates to the field of communication, and in particular to a method and a system for establishing a media channel based on relay.

BACKGROUND OF THE INVENTION

Peer-to-Peer (P2P) technology, also called P2P Internet technology, equally connects nodes of a network to each other, and each host node functions as both to client and server. At present, in the P2P technology, symmetrical Network Address Translation (NAT) traversal is mainly realized by relay. By deploying a relay server on the Internet, a public network address-port (IP-Port) pair of a session is acquired before this session is actually initialized and the public network IP-Port pair is taken as the address information of a user of the session.

Figure 1:
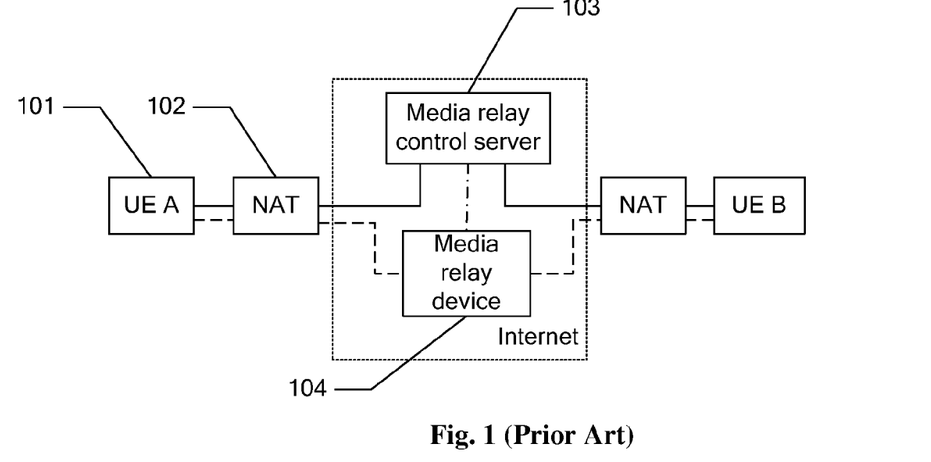
FIG. 1 shows a network scene of NAT traversal of a P2P connection between network nodes.

FIG. 1 shows a schematic structure diagram of a network for solving symmetrical NAT traversal according to related art. The User Equipment (UE) 101 is a terminal device used by a user; the NAT 102 is located between the UE and the Internet and responsible for shielding the access to this UE; the media relay control server 103 is responsible for allocating the media relay device 104 for a user session and controlling the media relay device 104 to reserve resource for the user session; the media relay device 104 is responsible for forwarding communication data for two parties of the communication. Generally, the media relay control server 103 and the media relay device 104 are located in a public Internet.

Figure 2:
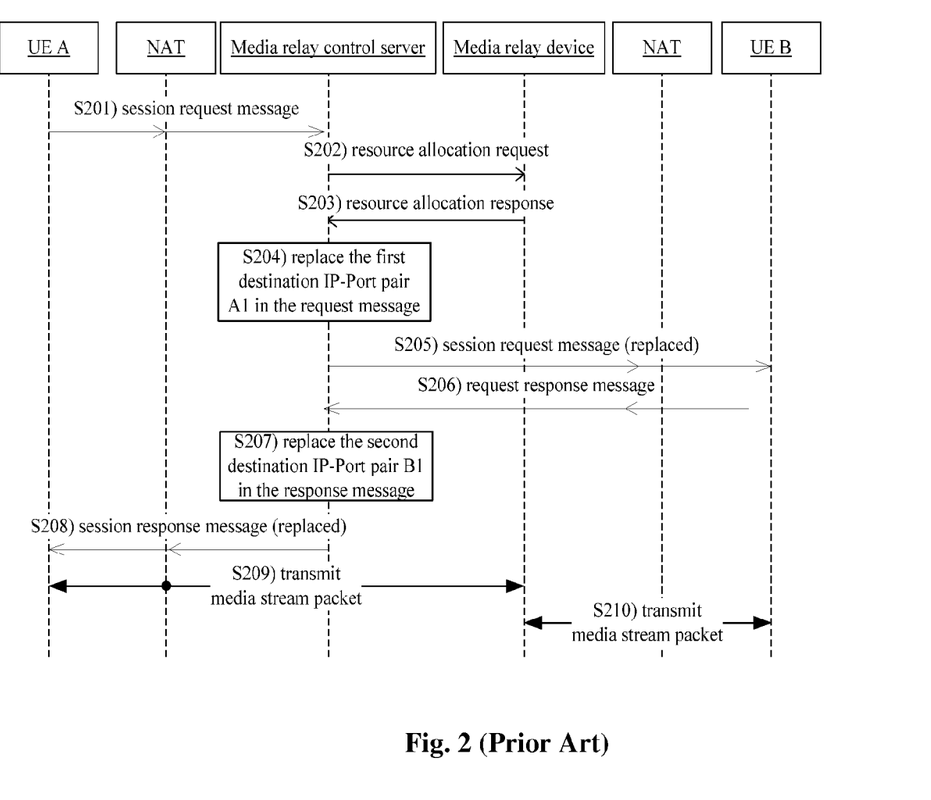
FIG. 2 shows a flowchart of a user establishing a P2P connection by traversing NAT according to a related art.

If a UE A and a UE B are to perform media communication therebetween, they need to perform session negotiation first, then establish a P2P connection between the UE A and the UE B and notify each other of their public IP-Port pairs. FIG. 2 shows a flowchart of a process of solving NAT traversal based on a relay technology and establishing a P2P connection between user nodes, wherein the process mainly comprises the following steps.

Step 201: before a session is initialized, both UE A and UE B need to register in a media relay control server. When establishing the session, the UE A transmits a session request to the media relay control server, wherein the request carries a first destination address-port pair A1 of the UE A for receiving response information from the UE B.

Step 202: the relay control server requests a media relay device to reserve media resource for this session. The media resource allocated by the media relay device includes a first public IP-Port pair used for receiving a media data packet transmitted from the UE A and a second public IP-Port pair used for receiving a media data packet transmitted from the UE B, and then a binding relationship of data forwarding between the first public IP-Port pair and the second public IP-Port pair is established.

Step 203: the media relay device returns the reserved media resource information to the media relay control server; meanwhile, the media relay device begins monitoring data on the reserved resource, that is, on the first public IP-Port pair and the second public IP-Port pair.

Step 204: the media relay control server replaces the first destination IP-Port pair A1 in the session request message with the first public IP-Port pair.

Step 205: the media relay control server forwards the replaced session request message to the UE B.

Step 206: the UE B receives the session request, extracts the first public IP-Port pair from the session request message as the communication address information of the UE A, and returns an acknowledgement response message to the media relay control server; wherein the response message includes a second destination IP-Port pair B1 of the UE B for receiving response information from the UE A.

Step 207: the media relay control server replaces the second destination IP-Port pair B1 in the acknowledgement response message with the second public IP-Port pair.

Step 208: the UE A receives a session acknowledgment response message, extracts the second public IP-Port pair from the acknowledgment response message as the communication address information of the UE B.

Step 209 to Step 210: the UE A and the UE B establish a media channel therebetween through the media relay device to perform media communication.

Figure 3:
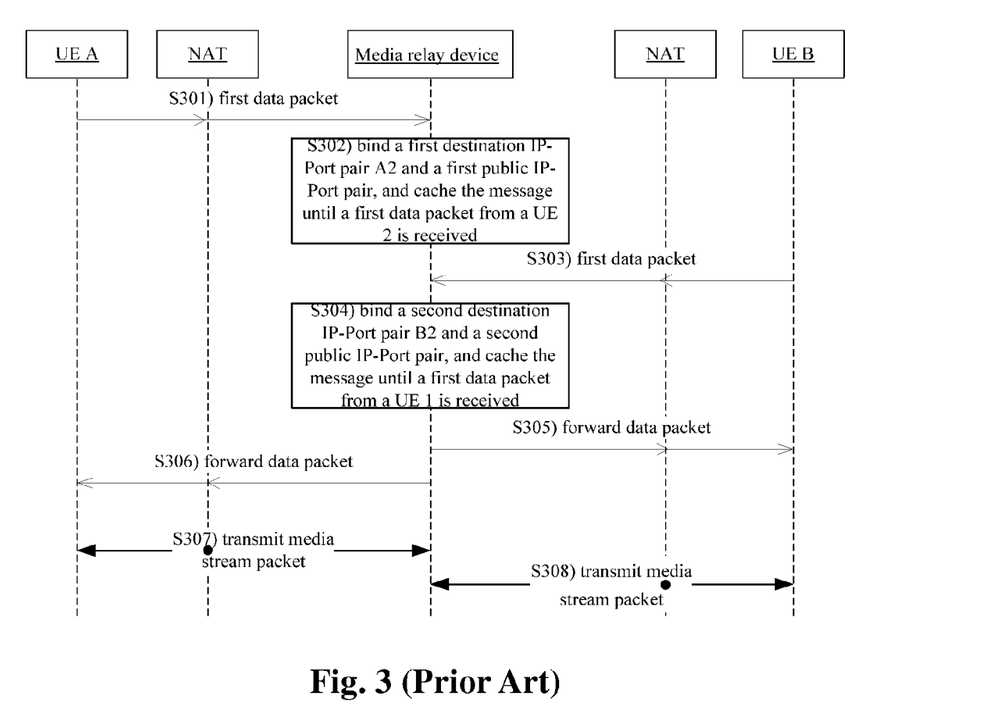
FIG. 3 shows a flowchart of establishing a media channel according to a conventional art.

FIG. 3 shows a flowchart of establishing a media channel between a UE A, a UE B and a media relay device according to a related art, wherein the process mainly comprises the following steps.

Step 301: after receiving a session acknowledgement response message from the UE B, the UE A transmits a first media data packet to the UE B; since the UE A extracts the second public IP-Port pair from the acknowledgment response message as the communication address of the UE B, the media data packet of the UE A is transmitted to the second public IP-Port pair of the media relay device.

Step 302: the media relay device receives the first media data packet from the UE A, establishes a binding relationship between a first destination IP-Port pair A2 (that is, a media plane address-port pair of the UE A) and the second public IP-Port pair, and caches the media data packet transmitted from the UE A until a media data packet from the UE B is received.

Step 303: the UE B transmits a first media data packet to the UE A, wherein the media data packet is transmitted to the first public IP-Port pair of the media relay device.

Step 304: the media relay device receives the first media data packet from the UE B, establishes a binding relationship between a second destination IP-Port pair B2 (that is, a media plane address-port pair of the UE B) and the first public IP-Port pair, and caches the media data packet transmitted from the UE B until a media data packet from the UE A is received.

Step 305 to Step 306: after receiving the first media data packet from the UE A and the UE B respectively, the media relay device establishes an association relationship among the first destination IP-Port pair A2, the second public IP-Port pair, the first public IP-Port pair and the second destination IP-Port pair B2, forwards the data received by the second public IP-Port pair to the UE B through the first public IP-Port pair and forwards the data received by the first public IP-Port pair to the UE A through the second public IP-Port pair based on the association relationship.

Step 307 to Step 308: subsequent media data packets between the UE A and the UE B are forwarded through the media relay device based on the association relationship.

Step 301 to Step 302 and Step 303 to Step 304 can be executed simultaneously; however, Step 305 and the following steps only can be executed after Step 301 to Step 304 is executed.

From the processes shown in FIG. 2 and FIG. 3, it can be seen that, in the related art, after pre-allocating two public IP-Port pairs, the media relay device begins monitoring the two ports; when a first media data packet is received on a public IP-Port pair, the media relay device binds the source IP-Port of the media data packet with this public IP-Port and forwards the media data packet to the final destination IP-Port through the other public IP-Port pair. Therefore, when the first media data packet received by the media relay device on a public IP-Port pair is malicious, the establishment of the media channel would fail.

SUMMARY OF THE INVENTION

The disclosure provides an establishment of a media channel based on relay, to at least solve the above problem that the establishment of the media channel would fail when a first media data packet received by a media relay device on a public IP-Port pair is malicious.

According to one aspect of the disclosure, a method for establishing a media channel based on relay is provided, comprising: during a session negotiation process between a first UE and a second UE, a media relay control server allocating a first service identifier and a second service identifier, transmitting the first service identifier to the first UE, transmitting the second service identifier to the second UE, and transmitting the first service identifier and the second service identifier to a media relay device; the media relay device receiving the service identifiers reported by the first UE and the second UE; the media relay device verifying, according to the first service identifier and the second identifier transmitted by the media relay control server, the service identifiers reported by the first UE and the second UE, and establishing a media channel between the first UE and the second UE if the verification is passed.

The media relay device receiving the service identifiers reported by the first UE and the second UE comprises: the media relay device receiving a first media data packet transmitted from the first UE to the second UE and acquiring the service identifier reported by the first UE from the message; the media relay device receiving a first media data packet transmitted from the second UE to the first UE and acquiring the service identifier reported by the second UE from the message.

The media relay device receiving the service identifiers reported by the first UE and the second UE comprises: after the session negotiation is ended, the first UE first transmitting a first binding request to the media relay device before transmitting the first media data packet to the media relay device; the media relay device receiving the first binding request and acquiring the service identifier reported by the first UE from the first binding request; after the session negotiation is ended, the second UE first transmitting a second binding request to the media relay device before transmitting the first media data packet to the media relay device; the media relay device receiving the second binding request and acquiring the service identifier reported by the second UE from the second binding request.

The first service identifier and the second service identifier are character strings or sequence number, or, the first service identifier and the second service identifier are user name-password pairs.

The first service identifier or the second service identifier indicate a range of a start sequence number of a packet; the media relay device receiving the service identifiers reported by the first UE and the second UE respectively comprises: the media relay device receiving the first packets from the first UE and the second UE respectively after the session negotiation is ended and acquiring the sequence number of the packets; the media relay device verifying the service identifiers reported by the first UE and the second UE comprises: the media relay device judging whether the sequence number of the first packet from the first UE is in the range indicated by the first service identifier, and judging whether the sequence number of the first packet is from the second UE is in the range indicated by the second service identifier, if so, the verification is passed.

The first service identifier and the second service identifier are the same.

The first service identifier and the second service identifier are different.

According to another aspect of the disclosure, a system for establishing a media channel based on relay is provided, comprising: a media relay control server, configured to allocate a first service identifier and a second service identifier during a session negotiation process between a first UE and a second UE, transmit the first service identifier to the first UE, transmit the second service identifier to the second UE, and transmit the first service identifier and the second service identifier to a media relay device; the media relay device, configured to receive the service identifiers reported by the first UE and the second UE, and verify, according to the first service identifier and the second identifier transmitted by the media relay control server, the service identifiers reported by the first UE and the second UE, and establish a media channel between the first UE and the second UE if the verification is passed.

The media relay device is configured to receive, after the session negotiation is ended, first media data packets transmitted by the first UE and the second UE and to acquire the service identifiers reported by the first UE and the second UE from the messages.

The media relay device is configured to receive, after the session negotiation is ended, binding requests transmitted by the first UE and the second UE before the first UE and the second UE transmit the first media data packets and acquire the service identifiers reported by the first UE and the second UE from the binding requests.

By virtue of the disclosure, during the session negotiation process of requesting the media relay device to reserve a resource, the media relay control server simultaneously transmits a unique identifier allocated for this session; the media relay device verifies the identifier of this session carried in a user packet while establishing a media channel of this session for the user, thus the problem that the establishment of the media channel would fail when the media relay device receives a malicious data packet on a port reserved for this session is solved, the malicious attack is avoided and the security of connections between network nodes is improved.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF THE EMBODIMENTS

The disclosure will now be described in detail with reference to the accompanying drawings and in conjunction with embodiments hereinafter. The embodiments in the present application and the features in the embodiments can be combined with each other if there is no conflict.

Embodiment 1

Figure 4:
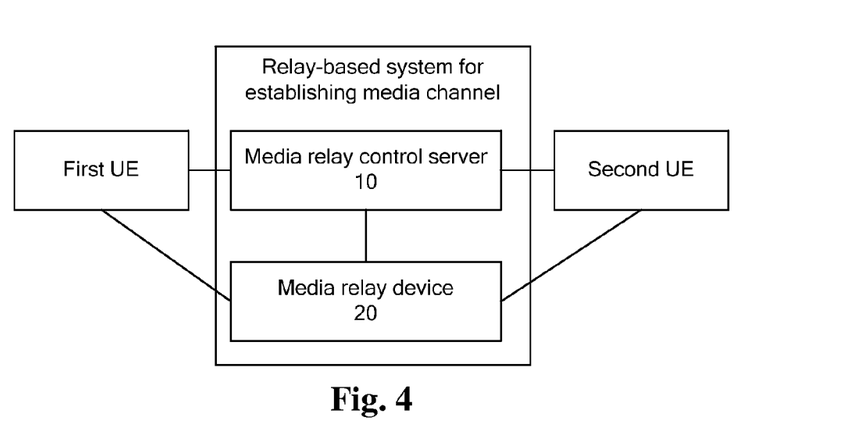
FIG. 4 shows a schematic structure diagram of a system for establishing a media channel based on relay according to an Embodiment 1 of the disclosure.

FIG. 4 shows a schematic structure diagram of a system for establishing a media channel based on relay according to the Embodiment 1 of the disclosure. The system mainly comprises: a media relay control server 10 and a media relay device 20, wherein the media relay control server 10 is configured to allocate a first service identifier and a second service identifier during a session negotiation process between a first UE and a second UE, transmit the first service identifier to the first UE, transmit the second service identifier to the second UE, and transmit the first service identifier and the second service identifier to a media relay device 20; the media relay device 20 is configured to receive the service identifiers reported by the first UE and the second UE respectively, and verify, according to the first service identifier and the second identifier transmitted by the media relay control server 10, the service identifiers reported by the first UE and the second UE, and establish a media channel between the first UE and the second UE if the verification is passed.

For example, the service identifiers allocated by the media relay control server 10 to the first UE and the second UE can be user name-password pairs generated randomly, also can be character strings and sequence number generated randomly with certain meanings, for example, the start sequence number of a packet transmitted by the first UE and the second UE. Besides, the first service identifier and the second service identifier allocated by the media relay control server 10 to the first UE and the second UE can be same or different.

In a relevant art, when the media relay device 20 establishes a media channel for two parties of a session and a first data packet is received on a public IP-Port pair, the media relay device 20 binds the source IP-Port of the data packet with the public IP-Port, thus a third party can carry out an attack by maliciously scanning the IP-port pair of the media relay device 20, thereby causing the establishment of the media channel to fail. In the embodiment of the disclosure, during a session negotiation process, the media relay server 10 allocates service identifiers for two parties of the session and establishes a media channel according to the service identifier reported by the two parties when establishing the media channel, thus, the security hazard caused by a malicious data packet is avoided, the security of connections between network nodes is guaranteed and the success rate of the media channel to establishment is improved.

The first UE and the second UE can carry the service identifiers allocated by the media relay server 10 in first media data packets after the session negotiation is ended, also can transmit binding requests before transmitting the first media data packets, request the media relay device 20 to bind a terminal communication address-port pair with an allocated corresponding public IP-Port pair, and carry the service identifiers allocated by the media relay server 10 in the binding requests. Therefore, the media relay device 20 can be configured to receive, after the session negotiation is ended, the first media data packets transmitted by the first UE and the second UE respectively, acquire the service identifiers reported by the first UE and the second UE from the messages, verify the service identifiers, and establish a media channel between the first UE and the second UE if the verification is passed; or, the media relay device 20 can be configured to receive, after the session negotiation is ended, the binding requests transmitted by the first UE and the second UE respectively before the first UE and the second UE transmit the first media data packets and acquire the service identifiers reported by the first UE and the second UE from the binding requests; in this way, the problem that the data of one party of the session can not be transmitted when the opposite party has not transmitted media data for a long time is solved.

Embodiment 2

Figure 5:
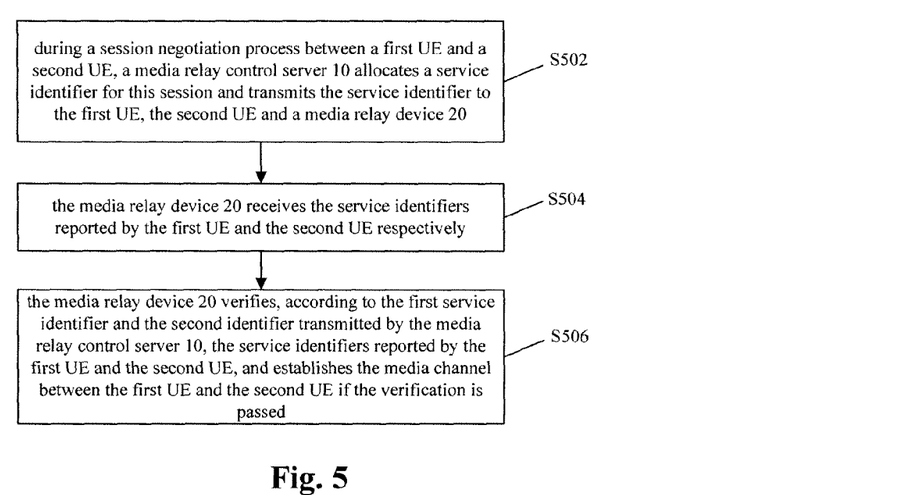
FIG. 5 shows a flowchart of a method for establishing a media channel based on relay according to an Embodiment 2 of the disclosure.

FIG. 5 shows a flowchart of a method for establishing a media channel based on relay according to an Embodiment 2 of the disclosure, and this method can be implemented by the system of the Embodiment 1. The method comprises the following steps.

Step 502: during a session negotiation process between a first UE and a second UE, a media relay control server 10 allocates a service identifier for this session and transmits the service identifier to the first UE, the second UE and a media relay device 20;

wherein, the media relay control server 10 allocates a first service identifier and a second service identifier, transmits the first service identifier to the first UE, transmits the second service identifier to the second UE, and transmits the first service identifier and the second service identifier to the media relay device 20;

wherein, the service identifier allocated by the media relay control server 10 can be a unique user name/password pair, also can be a special character string or sequence number.

In addition, the service identifier allocated by the media relay control server 10 to the UE1/UE2 can be same, also can be different.

Step 504: the media relay device 20 receives the service identifiers reported by the first UE and the second UE respectively;

wherein, after finishing the session negotiation, the first UE and the second UE can carry the service identifier transmitted by the relay control server 10 while transmitting a first media data packet; for example, if the service identifiers transmitted by the media relay control server 10 to the first UE and the second UE is user name-password pairs, then the first UE and the second UE carry the user name-password pair in the first media data packet transmitted to the opposite end user respectively. After receiving the first media data packet transmitted from the first UE, the media relay device 20 acquires the service identifier reported by the first UE from the message; after receiving the first media data packet transmitted from the second UE, the media relay device 20 acquires the service identifier reported by the second UE from the message. In this way, the UE only needs to carry the allocated service identifier in the first media data packet transmitted, without transmitting an extra message.

Or, the first UE and the second UE may not carry the service identifier in the first media data packet transmitted to the media relay device 20, but transmit, after the session negotiation is ended, a special binding request to the media relay device 20 before transmitting the first media data packet, to request the media relay device 20 to bind a terminal communication address-port pair with an allocated corresponding public IP-Port pair, and carry the service identifier in the binding request; after receiving the binding requests transmitted from the first UE and the second UE, the media relay device 20 acquires the service identifiers reported by the first UE and the second UE from the binding requests respectively; then Step 506 is executed. Thus, the problem that the media channel between the first UE and the second UE can only be established after the two parties transmit data is solved.

Step 506: the media relay device 20 verifies, according to the first service identifier and the second identifier transmitted by the media relay control server 10, the service identifiers reported by the first UE and the second UE, and establishes the media channel between the first UE and the second UE if the verification is passed.

For example, if the media relay control server 10 allocates a user name-password pair for the first UE and the second UE, the media relay device 20 verifies whether the user name-password pair reported by the first UE and the second UE matches with the user name-password pair allocated by the media relay control server 10; if so, the verification is passed, the media relay device 20 establishes the media channel between the first UE and the second UE, that is, establishes the binding of forwarding addresses.

In the embodiment of the disclosure, the media relay control server 10 allocates a service identifier for the current session of two parties of a session during the session negotiation process, and judges whether the service identifier reported by the two parties matches with the service identifier allocated by the media relay control server 10 when establishing a media data stream, thus, the problem of media channel establishment failure between the two parties caused by malicious port scanning is effectively avoided. Besides, in the embodiment of the disclosure, the two parties can transmit binding requests to the media relay device 20 after the session negotiation process is finished, to request the establishment of address binding, thus, the problem that the data of one party of the session can not be transmitted when the opposite party has not transmitted media data for a long time is solved.

Embodiment 3

Embodiment 3 of the disclosure describes the process adopting the technical solution provided by the embodiment of the disclosure, which is a process of a UE establishing a P2P connection by traversing NAT. In the embodiment of the disclosure, when processing a session request of a UE, the media relay control server 10 allocates a pair of unique session service identifiers for the session, wherein the session identifiers are transmitted to the UE A, the UE B and the corresponding media relay device 20 simultaneously. In the embodiment of the disclosure, the unique session identifier allocated by the media relay control server 10 can be a user name-password pair generated randomly, also can be a character string or a sequence number with certain meanings generated randomly; besides, the service identifiers transmitted to the UE A and the UE B can be the same or different.

Figure 6:
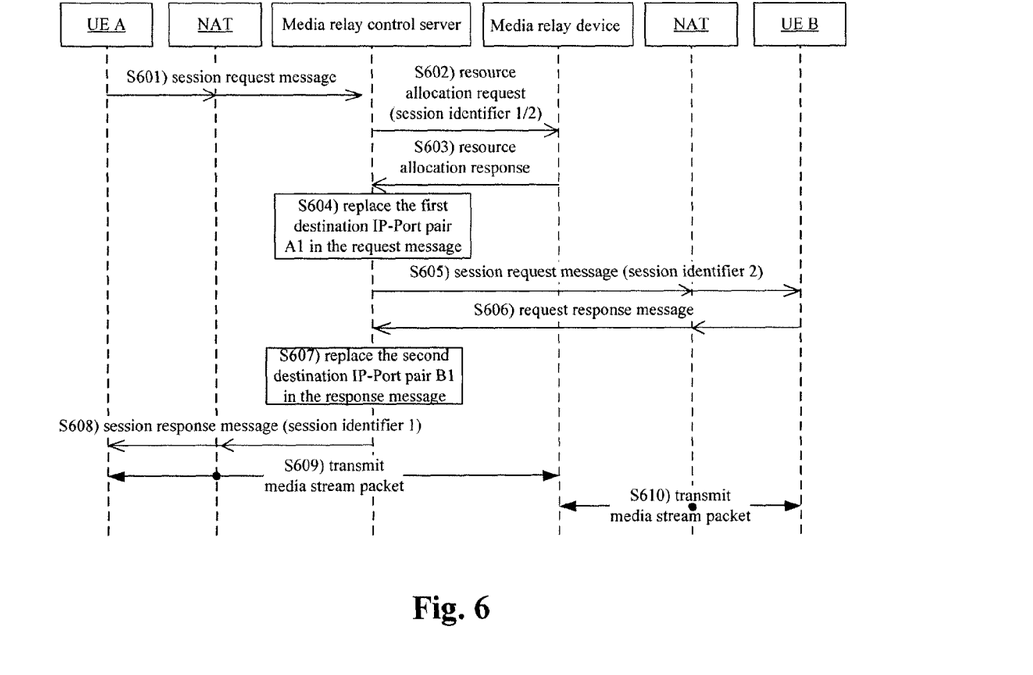
FIG. 6 shows a flowchart of a UE establishing a P2P connection by traversing symmetrical NATs according to an Embodiment 3 of the disclosure.

FIG. 6 shows a signalling flowchart of a UE A and a UE B establishing a P2P connection by traversing symmetrical NATs according to an embodiment of the disclosure, wherein the process mainly comprises the following steps.

Step 601: before the session is initialized, both UE A and UE B need to register in a media relay control server; when establishing the session, the UE A transmits a session request to the media relay control server, wherein the session request message carries a first destination IP-Port pair A1 of the UE A for receiving response information from the UE B.

Step 602: the relay control server allocates a pair of unique session service identifiers (session service identifier 1 and session service identifier 2) for two parties of this session, and requests a media relay device to reserve media resource for this session, wherein the media resource reservation request message carries the service session identifier 1/2 allocated for the two parties of this session;

wherein, the media resource allocated by the media relay device includes a second public IP-Port pair used for receiving a media data packet transmitted from the UE A and a first public IP-Port pair used for receiving a media data packet transmitted from the UE B, and a binding relationship of data forwarding between the first public IP-Port pair and the second public IP-Port pair is established.

Step 603: the media relay device returns the reserved media resource information to the media relay control server; meanwhile, the media relay device begins monitoring data on the reserved resource (that is, on the first public IP-Port pair and the second public IP-Port pair).

Step 604: the media relay control server replaces the first destination IP-Port pair A1 in the session request message with the first public IP-Port pair, and inserts the session service identifier 2 allocated for the UE B into the replaced session request message.

Step 605: the media relay control server forwards the replaced session request message to the UE B.

Step 606: the UE B receives the session request, extracts the first public IP-Port pair from the session request message as the communication address information of the UE A, extracts and saves the session service identifier 2 for the following media channel establishment, and returns an acknowledgement response message to the media relay control server, wherein the response message includes a second destination IP-Port pair B1 of the UE B for receiving response information from the UE A.

Step 607: the media relay control server replaces the second destination IP-Port pair B1 in the acknowledgement response message with the second public IP-Port pair, and inserts the session service identifier 1 allocated for the UE A into the replaced acknowledgement response message.

Step 608: the UE A receives the session acknowledgment response message, extracts the second public IP-Port pair from the acknowledgment response message as the communication address information of the UE B, extracts and saves the session service identifier 1 for the following media channel establishment.

Step 609 to Step 610: the UE A, the UE B and the media relay device establish a secure media channel using the session service identifier 1/2.

Figure 7:
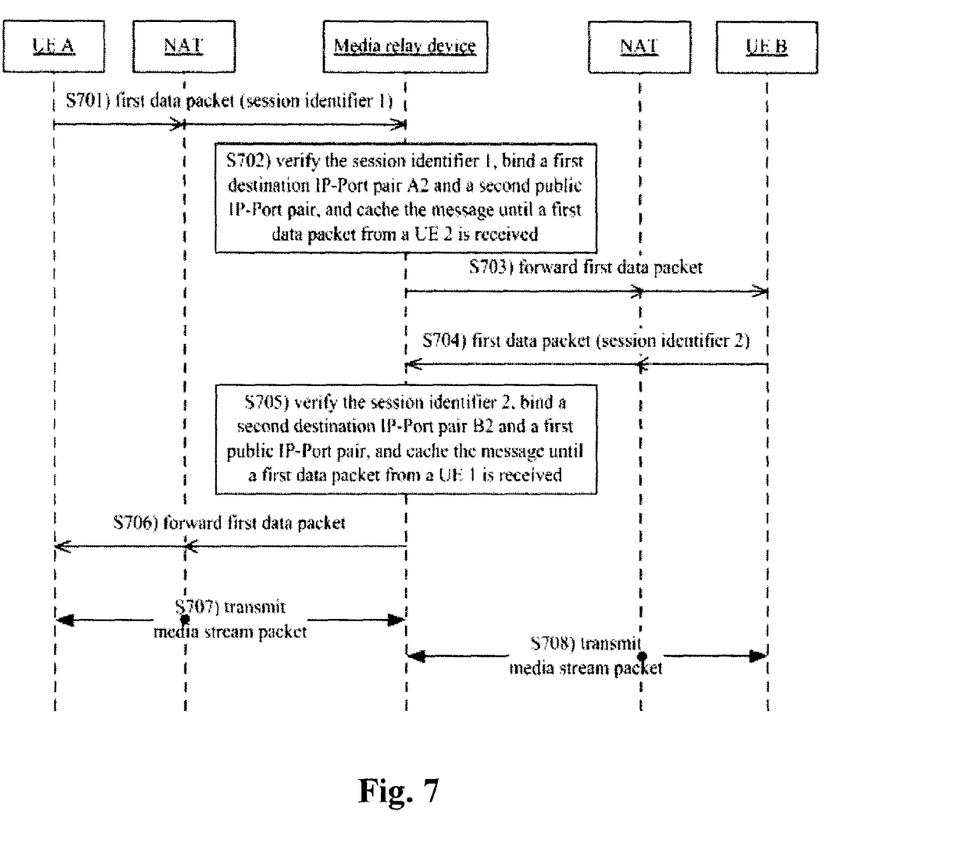
FIG. 7 shows a flowchart of establishing a secure media stream channel according to an Embodiment 3 of the disclosure.

The process of establishing a secure media channel using the service identifier 1/2 (Step 609 to Step 610) is shown in FIG. 7. In FIG. 7, after finishing the media session negotiation, the UE A and the UE B must carry the session service identifier 1/2 extracted from the session acknowledgement message/session request message while transmitting the first media data packet. While monitoring the first media data packets of the UE A and the UE B received on a port, the media relay device extracts the session service identifier and verifies whether the session service identifier matches with the session service identifier 1/2 received when the resource reservation request is received. Thus, the problem of media channel establishment failure caused by malicious port scanning is avoided.

As shown in FIG. 7, the establishment of the media channel mainly comprises the following steps.

Step 701: after receiving the session acknowledgement response message from the UE B, the UE A starts transmitting a first media data packet to the UE B.

Since the UE A extracts the second public IP-Port pair from the acknowledgment response message as the communication address information of the UE B, the media data packet of the UE A is transmitted to the second public IP-Port pair of the media relay device; meanwhile, the first data message transmitted by the UE A must carry the session service identifier 1 extracted from the session acknowledgement message.

Step 702: the media relay device receives the first media data packet from the UE A, detects that a first destination IP-Port pair A2 (that is, a media plane address-port pair of the UE A) has no complete association relationship, then extracts the session service identifier 1 from the packet and verifies it, establishes a binding relationship between the first destination IP-Port pair A2 and the second public IP-Port pair if the verification is passed, and caches the media data packet transmitted from the UE A until a media data packet from the UE B is received.

Step 703: the UE B transmits a first media data packet to the UE A, since the UE B extracts the first public IP-Port pair from the session request message as the communication address information of the UE A, the media data packet of the UE B is transmitted to the first public IP-Port pair of the media relay device; meanwhile, the first data packet transmitted by the UE B must carry the session service identifier 2 extracted from the session request message.

Step 704: the media relay device receives the first media data packet from the UE B, detects that a second destination IP-Port pair B2 (that is, a media plane address-port pair of the UE B) has no complete association relationship, then extracts the session service identifier 2 from the data message and verifies it, establishes a binding relationship between the second destination IP-Port pair A2 and the first public IP-Port pair if the verification is passed, and caches the media data packet transmitted from the UE B until a media data packet from the UE B is received.

Step 705 to Step 706: after receiving the first media data packet from the UE A and the UE B respectively, the media relay device establishes a complete association relationship among the first destination IP-Port pair A2, the second public IP-Port pair, the first public IP-Port pair and the second destination IP-Port pair B2, forwards the data received by the second public IP-Port pair to the UE B through the first public IP-Port pair and forwards the data received by the first public IP-Port pair to the UE A through the second public IP-Port pair based on the association relationship.

Step 707 to Step 708: subsequent media data packets between the UE A and the UE B are forwarded through the media relay device based on the association relationship.

In Step 702 and Step 704, for the received media data packet, if the first destination IP-Port pair A2 has no association relationship and no valid session service identifier can be extracted, this packet is discarded and the port is continuously monitored, thus, the problem of media channel establishment failure between the UE A and the UE B caused by malicious port scanning is avoided.

Embodiment 4

In this embodiment of the disclosure, the media negotiation process between the UE A and the UE B is as same as that of the Embodiment 3; the difference is that, during the process of media data stream establishment, the information of the session service identifier 1/2 can be not carried in the first media data packet of the UE A and the UE B in Step 707 to Step 708 in FIG. 7, but carried in a binding request transmitted before the media data packet is transmitted.

Figure 8:
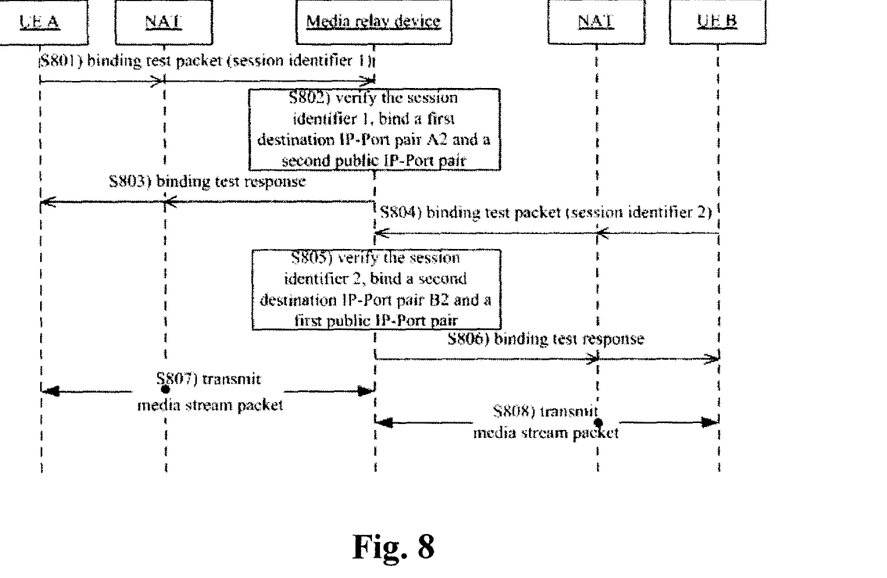
FIG. 8 shows a flowchart of establishing a secure media stream channel according to an Embodiment 4 of the disclosure.

FIG. 8 describes the process of establishing a media channel after a UE A/UE B finishes a session negotiation according to an embodiment of the disclosure. The difference from the process described in FIG. 7 lies in that the UE A/UE B transmits a first binding request to a media relay device before transmitting a first media data packet after receiving a session acknowledgement response/session request, and carries a corresponding session service identifier in the binding request message, thus, the problem that the data of one end can not be transmitted when the opposite end has not transmitted media data for a long time is solved.

As shown in FIG. 8, the process of establishing the media channel after the UE A/UE B finishes the session negotiation according to the present embodiment of the disclosure mainly comprises the following steps.

Step 801: after receiving a session acknowledgement response message from the UE B, the UE A starts transmitting a first binding request to the UE B immediately, wherein the binding request must carry a session service identifier 1 extracted from the session acknowledgement message.

Since the UE A extracts a second public IP-Port pair from the acknowledgment response message as the communication address of the UE B, the media data packet of the UE A is transmitted to the second public IP-Port pair of the media relay device.

Step 802: the media relay device receives the binding request from the UE A, extracts the session service identifier 1 from the packet and verifies it, establishes a binding relationship between a first destination IP-Port pair A2 and the second public IP-Port pair if the verification is passed.

Step 803: the media relay device returns a binding success response message to the UE A.

Step 804: after receiving a session request message from the UE A, the UE B starts transmitting a first binding request to the UE A immediately, wherein the binding request must carry a session service identifier 2 extracted from the session acknowledgement message.

Since the UE B extracts a first public IP-Port pair from the session request message as the communication address of the UE A, the media data packet of the UE B is transmitted to the first public IP-Port pair of the media relay device.

Step 805: the media relay device receives the binding request from the UE B, extracts the session service identifier 2 from the binding request and verifies it, establishes a binding relationship between a second destination IP-Port pair A2 and the first public IP-Port pair if the verification is passed.

Step 806: the media relay device returns a binding success response message to the UE B.

Step 807 to Step 808: through the steps above, the media relay device establishes a complete association relationship among the first destination IP-Port pair A2, the second public IP-Port pair, the first public IP-Port pair and the second destination IP-Port pair B2; the media data packets between the UE A and the UE B are forwarded through the media relay device based on the association relationship.

The above step 801 to step 803 and step 804 to step 806 can be executed simultaneously.

Embodiment 5

In this embodiment of the disclosure, a Session Initiation Protocol (SIP) is adopted to perform session negotiation and a Real-Time Transport Protocol (RTP) is adopted to establish a media channel.

In this embodiment of the disclosure, a UE A and a UE B adopt the process shown in FIG. 6 to perform media negotiation first; since the message process is basically the same, no further description is needed in this embodiment of the disclosure, wherein the media relay control server inserts the session service identifier 2/1 into a Session Description Protocol (SDP) message to transmit to the UE B and the UE A in Step 605 and Step 608.

Figure 9:
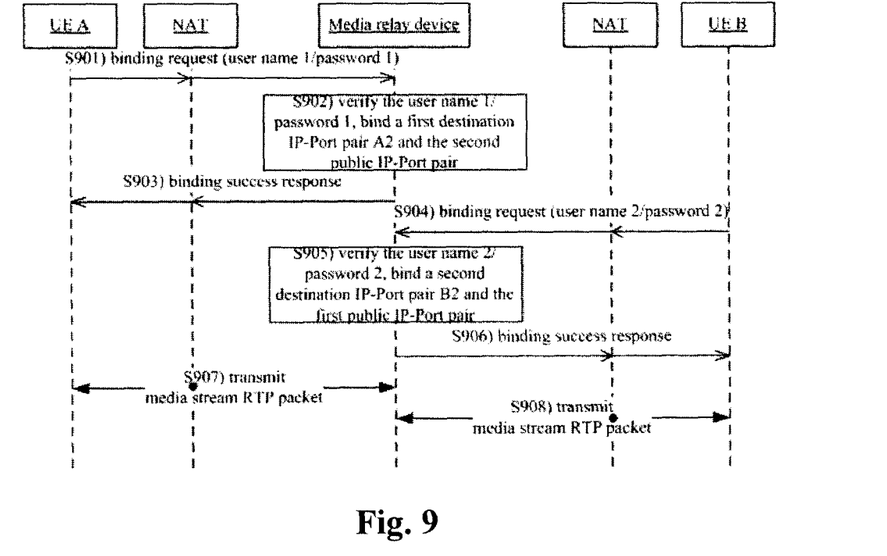
FIG. 9 shows a flowchart of establishing a secure media stream channel according to an Embodiment 5 of the disclosure.

FIG. 9 describes the specific process of establishing a media channel after a UE A and a UE B finish session negotiation according to an embodiment of the disclosure. As shown in FIG. 9, the process mainly comprises the following steps.

Step 901: after receiving a session acknowledgement response message from the UE B, the UE A starts transmitting a binding request to the UE B immediately, wherein the binding request must carry a user name1/password1 extracted from the session acknowledgement message.

Since the UE A extracts a second public IP-Port pair from the acknowledgment response message as the communication address of the UE B, the binding request of the UE A is transmitted to the second public IP-Port pair of the media relay device.

Step 902: the media relay device receives the binding request from the UE A, extracts the user name1/password1 from the binding request packet and verifies it, establishes a binding relationship between a first destination IP-Port pair A2 and the second public IP-Port pair if the verification is passed.

Step 903: the media relay device returns a binding success response message to the UE A.

Step 904: after receiving a session request message from the UE A, the UE B starts transmitting a binding request to the UE A immediately, wherein the binding request must carry a user name2/password2 extracted from the session acknowledgement message.

Since the UE B extracts a first public IP-Port pair from the session request message as the communication address of the UE A, the media data packet of the UE B is transmitted to the first public IP-Port pair of the media relay device.

Step 905: the media relay device receives the binding request from the UE B, extracts the name2/password2 from the binding request packet and verifies it, establishes a binding relationship between a second destination IP-Port pair B2 and the first public IP-Port pair if the verification is passed.

Step 906: the media relay device returns a binding success response message to the UE B.

Step 907 to Step 908: through the steps above, the media relay device establishes an complete association relationship among the first destination IP-Port pair A2, the second public IP-Port pair, the first public IP-Port pair and the second destination IP-Port pair B2, and the media data packets between the UE A and the UE B are forwarded through the media relay device based on the association relationship.

Embodiment 6

This embodiment of the disclosure describes the process of media channel establishment based on an RTP protocol; in the embodiment of the disclosure, the media channel establishment uses a sequence number of an RTP packet header to carry a session service identifier. Two parties UE A and UE B of the session first perform media negotiation based on the process shown in FIG. 6; since the message process is basically the same, no diagram is needed here; wherein the session service identifier 1/2 can be transmitted to the UE A and the UE B through an SIP message or an SDP message; and the session service identifier 1/2 is the range of the start sequence number of an RTP packet (that is, the range of the sequence number of the first RTP packet transmitted by the UE A and the UE B).

Figure 10:
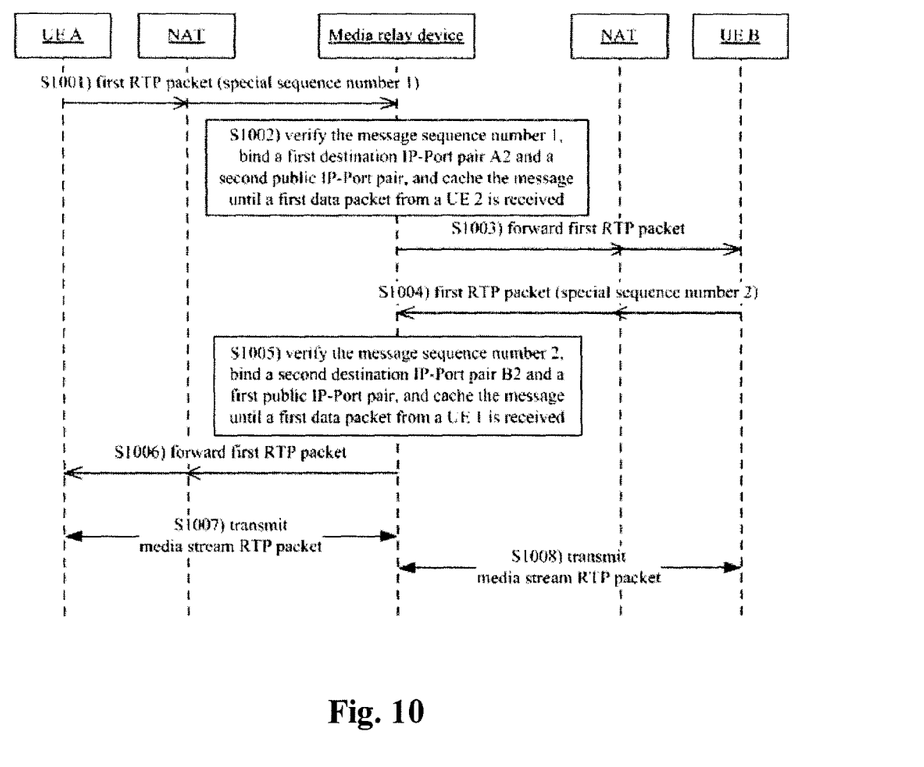
FIG. 10 shows a flowchart of establishing a secure media stream channel according to an Embodiment 6 of the disclosure.

FIG. 10 shows a flowchart of the specific process of establishing a media channel between a UE A and a UE B according to an embodiment of the disclosure, wherein the process mainly comprises the following steps.

Step 1001: after receiving a session acknowledgement response message from the UE B, the UE A starts transmitting a first RTP packet to the UE B immediately, wherein the RTP packet is a media data packet; since the UE A extracts a second public IP-Port pair B2 from the session acknowledgment response as the communication address of the UE B, the media data packet of the UE A is transmitted to the second public IP-Port pair of the media relay device, wherein the sequence number of the first RTP packet transmitted by the UE A must be in the range indicated by the session service identifier 1.

Step 1002: the media relay device receives the first RTP packet from the UE A, detects that a first destination IP-Port pair A2 has no compete association relationship, extracts an RTP sequence number from the RTP packet and verifies whether the RTP sequence number is in the range indicated by the service identifier 1, establishes a binding relationship between the first destination IP-Port pair A2 and the second public IP-Port pair if the verification is passed; and caches the media data packet transmitted from the UE A until a media data packet from the UE B is received.

Step 1003: the UE B transmits a first RTP packet to the UE A, wherein the RTP packet is a media data packet; since the UE B extracts a first public IP-Port pair from the session request message as the communication address of the UE A, the media data packet of the UE B is transmitted to the first public IP-Port pair of the media relay device; meanwhile, the sequence number of the first RTP packet transmitted by the UE B must be in the range indicated by the session service identifier 2.

Step 1004: the media relay device receives the first RTP packet of the UE B, detects that a second destination IP-Port pair B2 has no complete association relationship, extracts an RTP sequence number from the RTP packet and verifies whether the RTP sequence number is in the range indicated by the service identifier 2, establishes a binding relationship between the second destination IP-Port pair B2 and the first public IP-Port pair if the verification is passed; and caches the media data packet transmitted from the UE B until a media data packet from the UE A is received.

Step 1005 to Step 1006: after receiving the first RTP packet from the UE A and the UE B respectively, the media relay device establishes a complete association relationship among the first destination IP-Port pair A2, the second public IP-Port pair, the first public IP-Port pair and the second destination IP-Port pair B2, forwards the data received by the second public IP-Port pair to the UE B through the first public IP-Port pair and forwards the data received by the first public IP-Port pair to the UE A to through the second public IP-Port pair based on the association relationship.

Step 1007 to Step 1008: subsequent media data packets between the UE A and the UE B are forwarded through the media relay device based on the above association relationship.

Embodiment 7

This embodiment of the disclosure describes the process of establishing a media channel based on a Secure Real-Time Transport Protocol (SRTP). In this embodiment of the disclosure, when two parties of a session perform a media negotiation based on the process shown in FIG. 6, a media relay control server directly generates a primary key meeting the SRTP requirement as a service identifier and transmits it to a UE A, a UE B and a media relay device.

Figure 11:
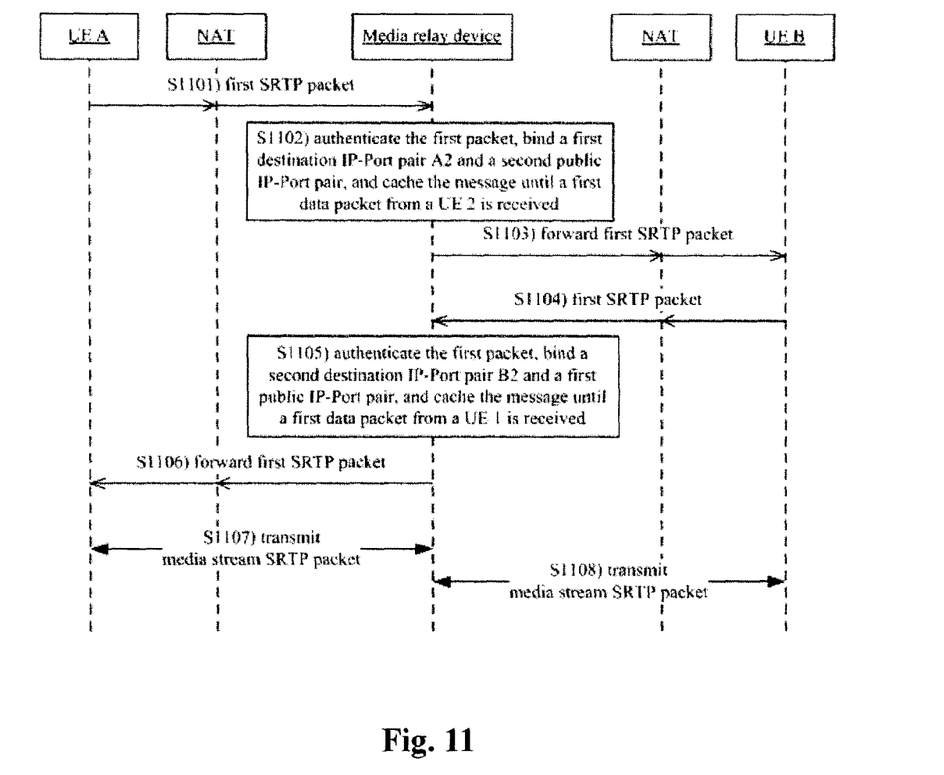
FIG. 11 shows a flowchart of establishing a secure media stream channel according to an Embodiment 7 of the disclosure.

FIG. 11 shows a flowchart of two parties of a session establishing a media channel based on an SRTP protocol according to an embodiment of the disclosure. As shown in FIG. 11, in this embodiment of the disclosure, the process is similar to that shown in FIG. 10, and the difference lies in that the first media data packet transmitted by the UE A and the UE B is an SRTP packet in FIG. 11, wherein the SRTP packet carries a primary key allocated by the media relay control server for the UE A and the UE B; when establishing the media channel, a media relay device authenticates the primary key carried in the first SRTP packet transmitted by the UE A, the UE B and performs address-port binding if the authentication is passed; and the media relay device does not need to authenticate the following SRTP packet. Therefore, the media channel establishment based on the SRTP protocol would not change the present SRTP protocol at all, only a distribution function of primary key needs to be added on the media relay control server and a function of authentication of a first packet needs to be added on the media relay device.

From the description above, it can be seen that, in the embodiments of the disclosure, when the media relay control server requests the media relay device to reserve resource and forwards media relay information to a user, the media relay control server simultaneously transmits a unique identifier allocated for this session; the media relay device verifies the identifier of this session carried in a user packet when establishing a media forwarding table of this session for the user, thus, the problem that when the media relay device receives a malicious data packet on a port reserved for this session, the media channel establishment would be failed is solved. Meanwhile, when receiving the media relay information forwarded by the media relay control server, the user can immediately transmit a binding request to the allocated media relay device, thus, the limit that the media relay device can forward media packets successfully only when receiving user media packets from both parties of the communication is avoided.

Apparently, those skilled in the art shall understand that the above-mentioned modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention

What is claimed is:

1. A method for establishing a media channel based on relay, comprising:

during a session negotiation process between a first User Equipment (UE) and a second UE, a media relay control server allocating a first service identifier and a second service identifier, transmitting the first service identifier to the first UE, transmitting the second service identifier to the second UE, and transmitting the first service identifier and the second service identifier to a media relay device;

the first UE reporting a third service identifier and the second UE reporting a fourth service identifier to the media relay device;

the media relay device, via a first media data packet transmitted respectively from the first UE and the second UE, or via a binding request transmitted before the first media data packet, receiving the third service identifier and the fourth service identifier reported by the first UE and the second UE, respectively; and the media relay device verifying, according to the first service identifier and the second service identifier transmitted by the media relay control server, whether the third service identifier and the fourth service identifier reported by the first UE and the second UE match with the first service identifier and the second service identifier allocated by the media relay control server, respectively, and establishing a media channel between the first UE and the second UE if the verification is passed;

wherein the media relay device receiving the third service identifier and the fourth service identifier reported by the first UE and the second UE comprises:

when the session negotiation process is completed, the first UE first transmitting a first binding request carrying the third service identifier to the media relay device;

the media relay device receiving the first binding request and acquiring the third service identifier reported by the first UE from the first binding request;

when the session negotiation process is completed, the second UE first transmitting a second binding request carrying the fourth service identifier to the media relay device; and the media relay device receiving the second binding request and acquiring the fourth service identifier reported by the second UE from the second binding request.

2. The method according to claim 1, wherein the media relay device receiving the third service identifier and the fourth service identifier reported by the first UE and the second UE comprises:

the media relay device receiving the first media data packet transmitted from the first UE to the second UE and acquiring the third service identifier reported by the first UE from the first media data packet transmitted from the first UE to the second UE; and the media relay device receiving the first media data packet transmitted from the second UE to the first UE and acquiring the fourth service identifier reported by the second UE from the first media data packet transmitted from the second UE to the first UE.

3. The method according to claim 1, wherein the first service identifier and the second service identifier are character strings or sequence number, or, the first service identifier and the second service identifier are user name-password pairs.

4. The method according to claim 1, wherein the first service identifier and the second service identifier indicate a range of a start sequence number of a packet;

the media relay device receiving the third service identifier and the fourth service identifier reported by the first UE and the second UE respectively comprises: when the session negotiation process is completed, the media relay device receiving a first packet from the first UE and acquiring a sequence number of the first packet from the first UE, receiving a first packet from the second UE and acquiring a sequence number of the first packet from the second UE; and the media relay device verifying whether the third service identifier reported by the first UE and the fourth service identifier reported by the second UE match with the first service identifier and the second service identifier allocated by the media relay control server comprises: the media relay device judging whether the sequence number of the first packet from the first UE is in the range indicated by the first service identifier, and judging whether the sequence number of the first packet from the second UE is in the range indicated by the second service identifier, if so, the verification is passed.

5. The method according to claim 3, wherein the first service identifier and the second service identifier are the same.

6. The method according to claim 3, wherein the first service identifier and the second service identifier are different.

7. The method according to claim 4, wherein the first service identifier and the second service identifier are same.

8. The method according to claim 4, wherein the first service identifier and the second service identifier are different.

9. A system for establishing a media channel based on relay, comprising:

a first hardware processor and a second hardware processor;

wherein the first hardware processor is configured to allocate a first service identifier and a second service identifier during a session negotiation process between a first User Equipment (UE) and a second UE, transmit the first service identifier to the first UE, transmit the second service identifier to the second UE, and transmit the first service identifier and the second service identifier to the second hardware processor;

wherein the first UE reports a third service identifier and the second UE reports a fourth service identifier to the second hardware processor;

wherein the second hardware processor is configured to receive, via a first media data packet transmitted respectively from the first UE and the second UE, or via a binding request transmitted before the first media data packet, the third service identifier reported by the first UE and the fourth service identifier reported by the second UE, and verify, according to the first service identifier and the second identifier transmitted by the first hardware processor, whether the third service identifier reported by the first UE and the fourth service identifier reported by the second UE match with the first service identifier and the second service identifier allocated by the first hardware processor, respectively, and establish a media channel between the first UE and the second UE if the verification is passed;

wherein the second hardware processor is configured to receive, when the session negotiation is completed, a first binding request carrying the third service identifier transmitted by the first UE and a second binding request carrying the fourth service identifier transmitted by the second UE, and acquire the third service identifier reported by the first UE and the fourth service identifier reported by the second UE from the first binding request and the second binding request.

\* \* \* \* \*